United States Patent
van der Zee et al.

(10) Patent No.: US 9,416,630 B2
(45) Date of Patent: Aug. 16, 2016

(54) GRID CALCULATION FOR FLUID FLOW MODELING

(71) Applicants: Wouter E. van der Zee, Voorburg (NL); Marc Holland, Mainz (DE)

(72) Inventors: Wouter E. van der Zee, Voorburg (NL); Marc Holland, Mainz (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 521 days.

(21) Appl. No.: 13/920,728

(22) Filed: Jun. 18, 2013

(65) Prior Publication Data

US 2014/0372095 A1    Dec. 18, 2014

(51) Int. Cl.
| | | |
|---|---|---|
| G06F 7/60 | (2006.01) | |
| G06F 17/10 | (2006.01) | |
| E21B 43/00 | (2006.01) | |
| G06F 17/50 | (2006.01) | |

(52) U.S. Cl.
CPC ............ *E21B 43/00* (2013.01); *G06F 17/5009* (2013.01); *G06F 17/5018* (2013.01); *G06F 2217/16* (2013.01)

(58) Field of Classification Search
CPC . E21B 43/00; G06F 17/5009; G06F 17/5018; G06F 2217/16
USPC ............................................ 703/9, 10; 702/6
See application file for complete search history.

(56) References Cited

U.S. PATENT DOCUMENTS

| | | | | |
|---|---|---|---|---|
| 8,798,970 | B2 * | 8/2014 | Sung ....................... | E21B 43/26 703/10 |
| 2010/0106472 | A1 * | 4/2010 | Kaminsky ............... | E21B 43/00 703/2 |
| 2012/0116740 | A1 * | 5/2012 | Fourno .................... | E21B 43/00 703/10 |
| 2013/0054207 | A1 * | 2/2013 | Souche ................... | E21B 43/26 703/2 |
| 2013/0144579 | A1 * | 6/2013 | Tetzlaff ............... | G06F 17/5009 703/6 |

OTHER PUBLICATIONS

Bourbiaux, "Fractured Reservoir Simulation: A Challenging and Rewarding Issue", Oil and Gas Science Technologoy—Rev. IFP, vol. 65, 2010, No. 2, pp. 227-238.
Nelson, "Geological Analysis of Naturally Fractured Reservoirs" (2nd edition), ISBN 0-88415-317-7, Gulf Professional Publishing, 2001, 43 pages total.
Oda, "Permeability tensor for discontinous rock masses", Geotechnique 35 (4), 1985, pp. 483-495.

* cited by examiner

*Primary Examiner* — Eunhee Kim
(74) *Attorney, Agent, or Firm* — Cantor Colburn LLP

(57) ABSTRACT

A method of estimating flow properties of an earth formation includes: selecting a grid block representing a region of the earth formation, the region including at least one of an area and a volume of the earth formation, the grid block including a plurality of grid cells and having an orientation defined by grid axes; and calculating a fluid flow model of the region. Calculating the model includes: estimating a principal flow direction for each grid cell; adjusting the orientation of the grid block based on the principal flow direction; and calculating fluid flow parameters in each grid cell to generate the fluid flow model.

20 Claims, 5 Drawing Sheets

GRID CALCULATION FOR FLUID FLOW MODELING

BACKGROUND

In hydrocarbon exploration and production industries, reservoir simulation technologies are used to characterize subterranean reservoirs. For example, a reservoir simulator can be employed to model fluid flow in a fractured formation. The effectiveness of such simulators depends in part on their ability to estimate fluid flow parameters including flow direction.

BRIEF SUMMARY OF THE INVENTION

A method of estimating flow properties of an earth formation includes: selecting a grid block representing a region of the earth formation, the region including at least one of an area and a volume of the earth formation, the grid block including a plurality of grid cells and having an orientation defined by grid axes; and calculating a fluid flow model of the region. Calculating the model includes: estimating a principal flow direction for each grid cell; adjusting the orientation of the grid block based on the principal flow direction; and calculating fluid flow parameters in each grid cell to generate the fluid flow model.

An apparatus for estimating flow properties of an earth formation includes: a data acquisition tool configured to collect fracture data about a plurality of fractures in the earth formation; and a processor configured to construct a model of the flow properties. The processor is configured to perform: selecting a grid block representing a region of the earth formation, the region including at least one of an area and a volume of the earth formation, the grid block including a plurality of grid cells and having an orientation defined by grid axes; and calculating a fluid flow model of the region. Calculating the model includes: estimating principal flow directions for each grid cell based on the fracture data; adjusting the orientation of the grid block based on the principal flow directions; and calculating fluid flow parameters in each grid cell to generate the fluid flow model.

BRIEF DESCRIPTION OF THE DRAWINGS

The following descriptions should not be considered limiting in any way. With reference to the accompanying drawings, like elements are numbered alike.

DETAILED DESCRIPTION

Systems and methods are provided for modeling and/or simulating earth formations, including calculating fluid flow parameters in formations exhibiting fluid flow. Exemplary formations include formations having natural and/or stimulated fractures. An embodiment of a method includes receiving or generating formation data for a reservoir, such as reservoir size and geological data, fluid flow data (e.g., matrix permeability and porosity), fluid composition, and production data. In addition, data influencing the principle fluid flow directions is received and/or generated, such as a fracture network model. Such a fracture network model includes, e.g., fracture orientation, position, size, aperture and/or other fracture flow properties.

A grid representing the reservoir formation is selected independent of and/or prior analyzing the fracture data. The grid may be randomly selected or selected based on considerations such as formation size and/or configuration. Permeability data (e.g., permeability tensors) is calculated from the fracture data and equivalent principal flow directions are calculated for each cell in the grid. In one embodiment, two- or three-dimensional equivalent principal flow directions are calculated for the grid cells and the grid orientation is adjusted, e.g., by rotating the grid, so that the grid axes at least substantially align with the principal flow directions or directions derived from the principal flow directions. The method may be performed automatically by a processor or processors according to a suitable algorithm.

Figure 1:
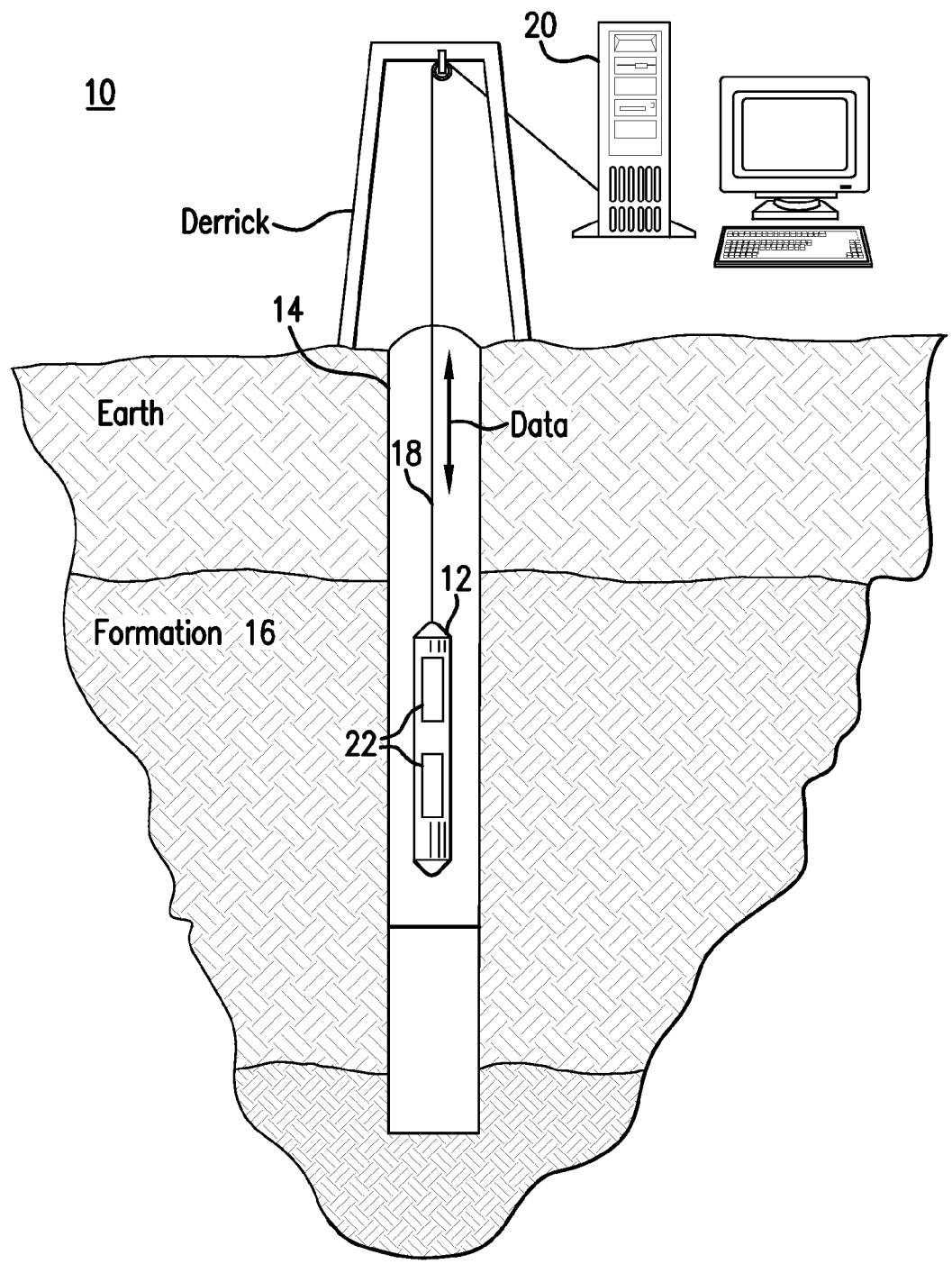
FIG. 1 depicts an embodiment of a data acquisition system.

FIG. 1 illustrates aspects of an embodiment of a data acquisition and/or measurement system 10. The system 10 includes a data acquisition tool 12 disposed, for example, in a borehole 14 in a formation 16. The data acquisition tool 12 is configured to monitor and/or collect data related to borehole characteristics, fluid characteristics and/or operational information.

The tool 12 may be deployed downhole via any suitable carrier, such as a wireline 18 or stimulation tubing, and/or is embodied as one or more surface sensing tools. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, bottomhole assemblies (BHA) and drill strings.

The earth formation 16 may include a reservoir of hydrocarbons or other fluids of interest. The formation 16 may also include a plurality of rock fractures, which may act as fluid pathways, impacting the hydraulic conductivity of formation fluids. The fractures may be naturally occurring fractures and/or fractures induced by a stimulation operation.

The data acquisition tool 12 is configured to measure various properties of the borehole, carrier and/or formation, and may include one or more sensors 22. For example, the tool 12 is configured to measure formation properties such as porosity and permeability. Such measurements may also be used to estimate characteristics of the fractures (e.g., fracture orientation, fracture size, fracture intensity, fracture transmissivity, or fracture aperture). Non-limiting embodiments of measurements performed by the data acquisition tool 12 include seismic, acoustic, pulsed-neutron, resistivity, and radiation.

In one embodiment, the system 10 is configured to provide measurement data that can be used to model the formation 16. For example, environmental measurements such as temperature and pressure may be performed. Fluid properties may be measured using tools such as sampling tools, flowrate sensors, resistivity sensors, density/viscosity sensors and optical sensors. Geological measurement data may be generated via tools such as coring or sampling tools and logging tools (e.g., logging-while-drilling (LWD) tools). For example, porosity can be measured via gravimetric, density, sonic, nuclear magnetic response (NMR) and/or neutron data. Permeability information can be derived from core and/or fluid sampling and pressure measurements, as well as from porosity data.

The tools 12 are connected to a suitable processing device or system such as a surface processing unit 20. The processing device includes components sufficient to allow the processing device to receive and analyze data. Analysis may include processing measurement data and other information to construct a model of formation characteristics. The processing device includes, for example, a power supply, input/output components, one or more processors, a memory device or system, telemetry components and/or one or more displays.

In one embodiment, a processing device such as the processing unit 20, which may include one or more processors, is configured to generate a mathematical model of fluid flow in a formation.

In one embodiment, the parameters of formations and/or geological features are estimated to populate the fluid flow model. An exemplary formation is a fractured formation. The fractured formation includes a plurality of fractures that may be interconnected. Fractures may include naturally occurring fractures and/or fractures resulting from stimulation (e.g., hydraulic fracturing).

Fractures can have various definitions and impacts on a formation, and are typically predicted to have an impact on reservoir permeability and/or porosity and often introduce flow anisotropy. Whether and how fractures impact the flow behaviour of the reservoir can be interpreted from a variety of observations and data, such as the measurement data described above. These can be collected during drilling, during well tests and/or production.

Exemplary fluid flow models include continuum-based numerical methods that can be used to model inherently discrete and discontinuous systems. In such models, individual fractures are not explicitly represented. Rather, their equivalent effect is calculated over a continuous region, which is then treated as a porous medium.

Examples of such continuum-based models include dual continua models (DCM) and dual porosity, dual permeability (DPDP) models. In DCDP models, two grids are selected for the same area and/or volume. A matrix grid includes porosity and permeability values for the formation matrix, i.e., rock and other material making up the formation. A fracture grid includes porosity and permeability values for the fractures in the same formation area and/or volume. The grids are connected using a shape factor that describes the contact area and location of the fractures in the matrix grid and a transfer function that captures the physical processes of the fluid exchange from the matrix to the fractures and vice versa.

The matrix porosity and permeability are populated using various known geological modeling techniques.

In one embodiment, the fracture data is derived from a fracture network model such as a discrete fracture network (DFN) model, which includes a stochastic representation of the subsurface network and describes parameters including the location, length, height and aperture of the fractures. The fracture model may be generated by the processing device (e.g., the processing unit 20) and/or received from a different source.

Multiple sources of information, i.e., fracture data, may be used to define the DFN. Direct measurements of fractures can be taken from, e.g., image logs as gathered by unit 12, where an interpreter or an automated system "picks" the fractures (using for example the processing unit 20). The typical parameters collected are location and orientation. Information on fractures can be gathered in outcrop analogues which have the same formation and structural setting as the subsurface formation. From the outcrop the relevant fracture sets may be identified. Close observations allow identifying the fracture orientation (dip, azimuth), spacing and cross cutting relationships. Actual three-dimensional subsurface data can also be used as basis to create a discrete fracture network, where available three-dimensional attributes are linked to relationships describing the fracture populations. Such attributes include, e.g., curvature, bedding thickness, shale content and others. Other information and data that can be used to generate a DFN include well images and microseismicity data. Literature information can be used to define any remaining fracture characteristics, and may support a link between the fracture properties and available attributes or may be used to compensate for missing properties or attributes.

The DFN model is constructed based on the fracture data. The DFN model is typically two- or three-dimensional, and is constrained by fracture data obtained from different data sources such as image logs or outcrop analogues. The fracture data is used to describe fracture sets with respect to various properties, such as orientation in space, geometry, spacing and aperture. For three-dimensional networks, one- or two-dimensional fracture parameters are typically linked to a three-dimensional attribute or property such as curvature, shale content, bedding thickness, fault proximity and others. The DFN model is built stochastically based on these relationships.

Fractures identified by the fracture data are grouped into fracture sets. A "fracture set" is a group of fractures having common or similar parameters. Each fracture set is defined based on parameters derived from the fracture data and based on other model parameters. For example, a fracture set is typically defined by groups of fractures having the same or similar orientation in space (the size, density and/or aperture may vary within the set).

The orientation may be described by the dip angle and the dip azimuth, and can be measured, for example, in-situ on an image log. The size is typically described by giving the fracture length and height. Size or geometric parameters such as length can be limited in some cases by cross-cutting relations, e.g., when a fracture sets terminates or abuts against an earlier fracture set. In addition, model parameters such as bedding dimensions may limit parameters such as the height of fractures. Next to these relative rules the absolute size of an isolated fracture may be described by statistical means. This may include fractal distributions, power law distributions or a simple Gaussian scatter around a mean size.

The fracture aperture may control the transmissibility and permeability of the geological system, and determines the flow properties of a fracture. The aperture can be measured in the field and can also be constrained on image logs. In most instances, the aperture can be related to fracture size and/or fracture orientation in respect to the stress field. Aperture can potentially be estimated, for example, via in-situ measurements and/or outcrop measurements. Typically, the fracture aperture size is linked to the geometric size of the fractures by an empirical correlation.

The fracture density is a measure of the abundance of certain types of fractures. This parameter can be expressed by a mean spacing or by testing the fracture area per unit volume. Depending on the fracture set, the density distribution can be very different. For example, fracture density can be constant (e.g., in the case of a systematic joint set) or heterogeneous (e.g., due to localized strain). The proximity to faults or folds typically increases the fracture density leading to fracture corridors and therefore a local clustering.

The fracture porosity in a fluid flow model such as the DCDP model may be calculated based on the aperture and fracture area estimated by the DFN. The fracture permeability in each grid cell may be calculated based on permeability parameters calculated via the DFN in the corresponding DFN area and/or volume. As the scale of the DFN is generally smaller than the scale of the fluid flow model (e.g., the fluid flow model can be a field-scale model), in one embodiment the fracture permeability derived from the DFN is "upscaled" to the fluid flow by deriving an equivalent permeability for each fracture cell, which can be calculated for each fracture cell on an analytical or a numerical basis.

Figure 2:
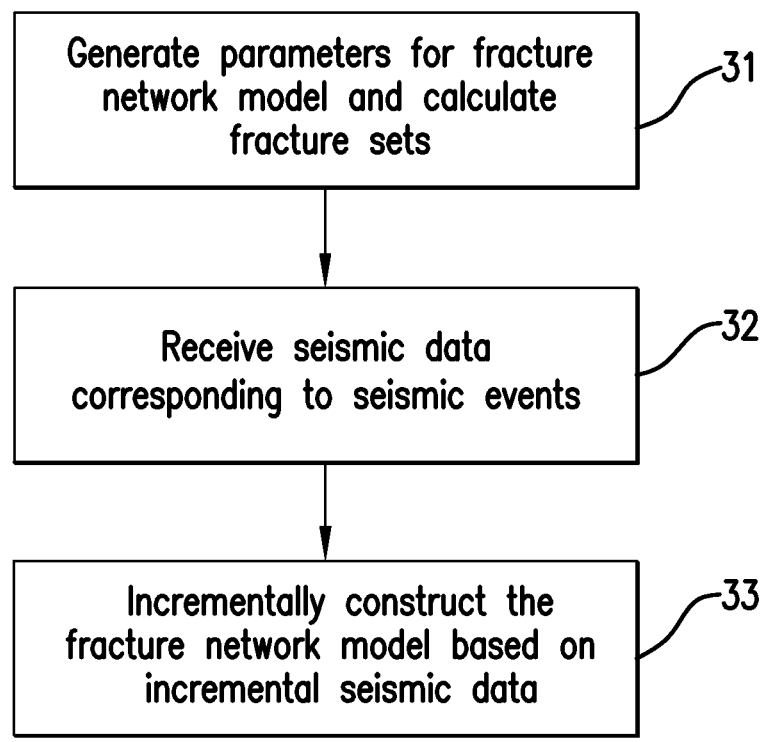
FIG. 2 is a flow chart providing an exemplary method of estimating flow properties of an earth formation.

FIG. 2 illustrates a method 30 for constructing or generating a model of a formation. In one embodiment, the model includes a mathematical model of a formation and/or reservoir including fluid flow characteristics. The method 30 includes one or more stages 31-34. The method 30 is performed by a processor (e.g., the processing unit 20) that receives formation parameter data and fracture data from one or more sources, such as the data acquisition tool 12. In one embodiment, the stages 31-34 are performed in the order described, although some steps may be performed in a different order or one or more steps may be omitted.

In one embodiment, the method 30 is performed as specified by an algorithm that allows a processor to automatically generate a formation fluid flow model. The processor as described herein may be a single processor or multiple processors (e.g., a network). For example, the method 30 may be used in conjunction with computing devices running commercially available reservoir simulators.

In the first stage 31, a grid for a reservoir model (e.g., DCDP) is chosen that represents an area and/or volume of a formation. The grid size and scale is selected based on information regarding the reservoir size and shape, or based on a selected region, such as a region for which data is available, a region around a well or a well field (field scale). The grid may be two- or three-dimensional. In one embodiment, the grid may include one or more grid blocks that include a plurality of smaller scale grid cells.

Figure 3:
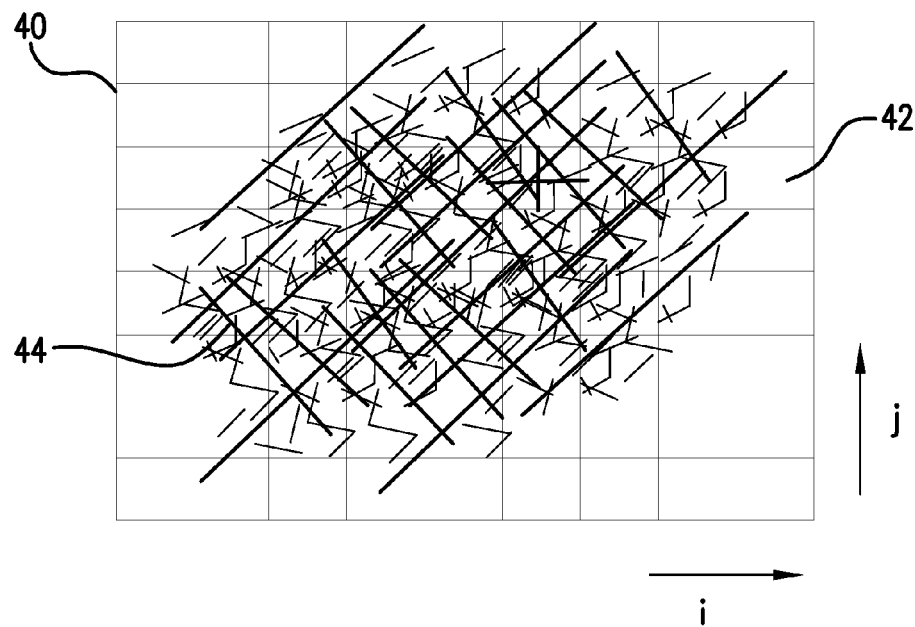
FIG. 3 depicts an embodiment of a selected grid for a fluid flow model.

An example of a grid block 40 is shown in FIG. 3, which illustrates an exemplary grid block selected for a fractured formation. The grid block 40 is discretized into a plurality of grid cells 42. It is understood that although the method 30 is described in conjunction with a single grid block, the method 30 can be applied to a grid area that includes multiple grid blocks depending on the size of the area to be modeled.

The grid block 40 and grid cells 42 have an initial selected orientation defined by axes "i" and "j". For a three-dimensional grid block, three axes may be defined, e.g., axes "i", "j" and "k". The axes i and j (or i, j and k), in one embodiment, are orthogonal axes, but are not so limited. The selected orientation is randomly selected, e.g., using a default orientation, or is otherwise selected independent of any fracture data.

Although the method 30 is described herein in conjunction with a fractured formation, the method can be used in conjunction with any geological features having a preferred orientation, such high permeable channel bodies in a low permeability shale.

In the second stage 32, fracture properties are applied to the grid. As discussed above, in one example, matrix flow properties are populated to the grid block 40 based on various measurement and/or modeling techniques. Fracture flow properties are estimated using fracture data and/or fracture model values, such as fracture properties calculated by a DFN model. An exemplary DFN model 44 is shown in FIG. 3 superimposed on the initially selected grid block 40.

The fracture porosity may be calculated based on the aperture and fracture area estimated by the DFN model 44. The fracture permeability for each grid cell 42 is calculated, in one embodiment, by calculating equivalent permeability tensors initially defined in the region of the DFN model 44 that corresponds to the grid cell 42.

In one embodiment, an equivalent fracture permeability of a grid cell 42 is defined by calculating the full permeability tensor for each grid cell 42, from which principal flow directions and associated magnitudes can be calculated. For every grid cell, the principal permeability directions and magnitudes are calculated.

Figure 4:
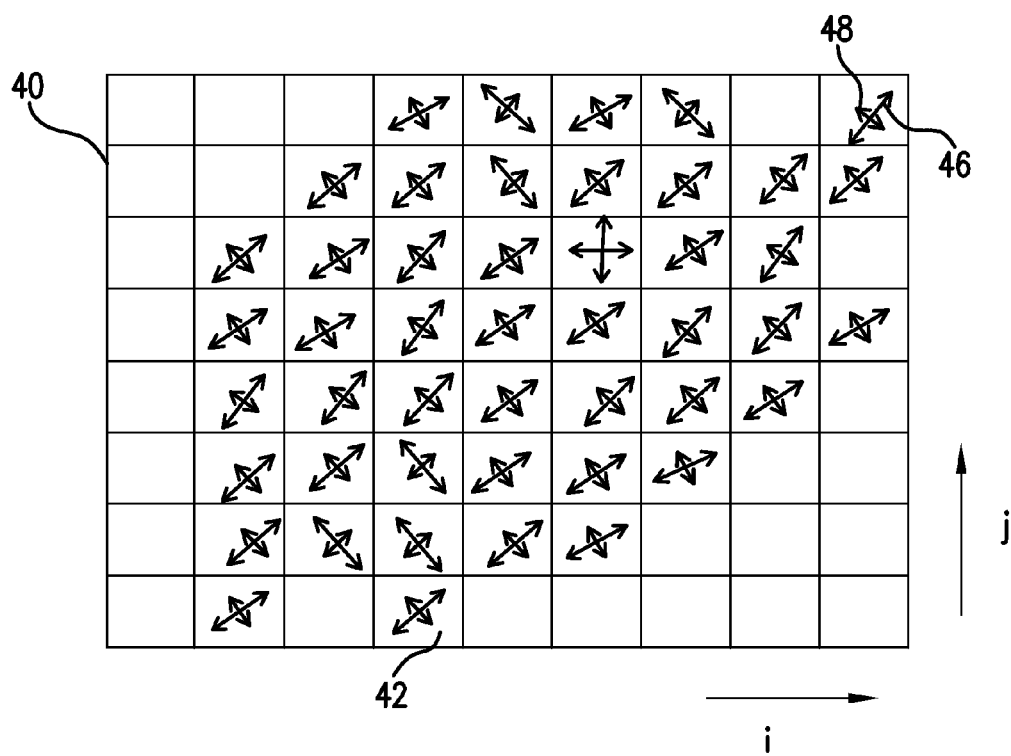
FIG. 4 depicts principal flow directions calculated for the selected grid of FIG. 3 based on fracture data.

FIG. 4 shows exemplary principal permeability directions for multiple grid cells 42 in the grid block 40. Each grid cell 42 is assigned a first principal permeability direction 46 and a second principal permeability direction 48. The directions 46 and 48 are associated with respective permeability magnitudes. If the grid block is three-dimensional, the permeability tensor for a grid cell may also include a third principal permeability direction and an associated magnitude.

In one embodiment, the equivalent permeability tensor is calculated to each grid cell using an analytical method such as (but not limited to) Oda's method. Oda's method uses a given fracture density for a number of different fracture sets with an inferred orientation. The fracture densities for individual fracture sets may be used, or a fracture density for a group of fracture sets may be used in combination with the probabilities of the individual fracture sets. In one embodiment, Oda's method is applied to well-connected networks. Although Oda's method provides only an approximation, it is advantageous as this method is very fast as compared to numerical methods. Furthermore, the Oda method allows calculating a full symmetric permeability tensor. Aspects of Oda's method are further described in Oda, M. (1985), "Permeability tensor for discontinuous rock masses", Geotechnique 35 (4), 483-495, the contents of which are hereby incorporated by reference in their entirety.

In another embodiment, the permeability tensor is calculated for each grid cell by performing a numerical simulation such as a finite element simulation on the single grid cells. For this, the grid block's content is discretized on an unstructured grid. Darcy's law and the cubic law are applied to simulate the flow through fractures for simple boundary conditions. For structured grids the condition is typically used to constrain the flow properties in the three principal directions of the grid block to obtain a diagonal permeability tensor because many reservoir simulators using structured grids can only handle these three diagonal components.

In the third stage 33, a suitable or optimal grid orientation is obtained by adjusting the orientation of the grid block (in two or three dimensions) based on the principal flow directions. In one embodiment, a grid is designed by rotating the selected grid block so that the axes of the grid block are at least substantially parallel to the principal directions.

Figure 5:
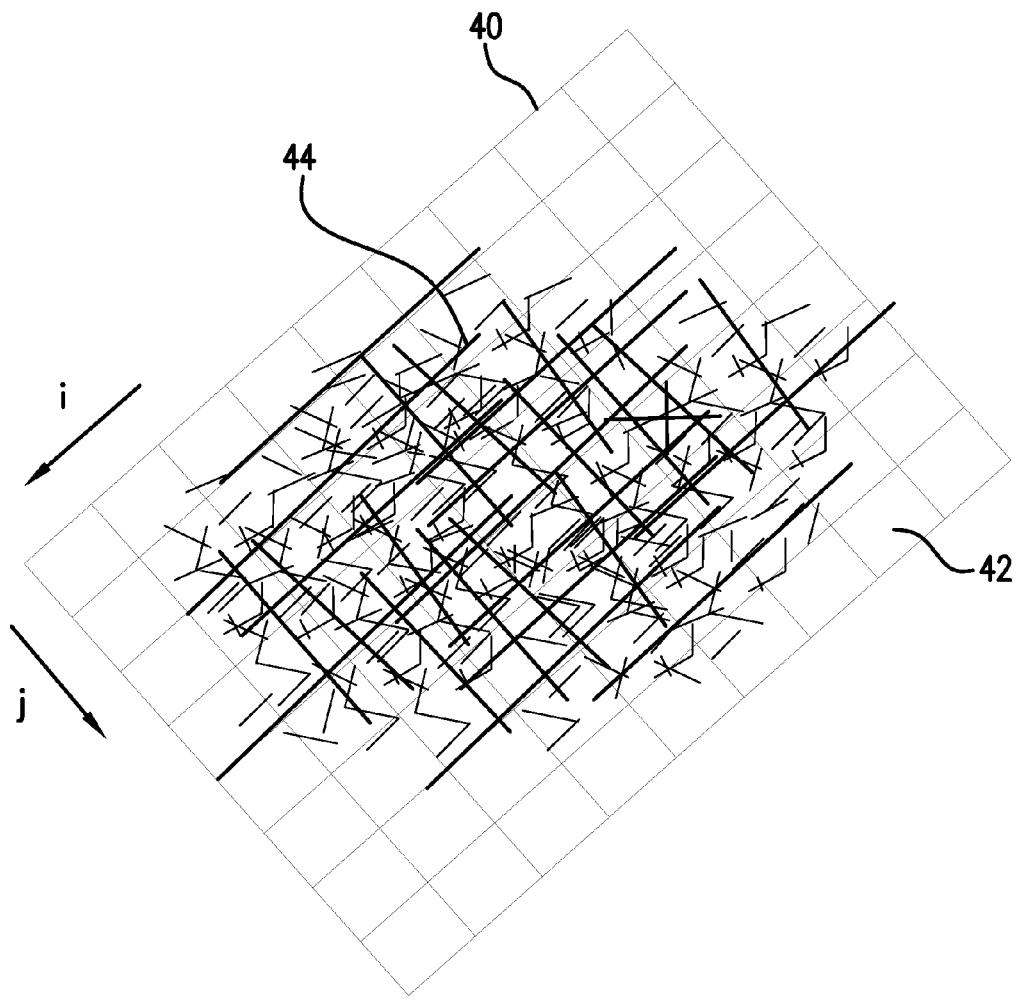
FIG. 5 depicts the selected grid having an orientation adjusted based on the principal flow directions of FIG. 4.
Figure 6:
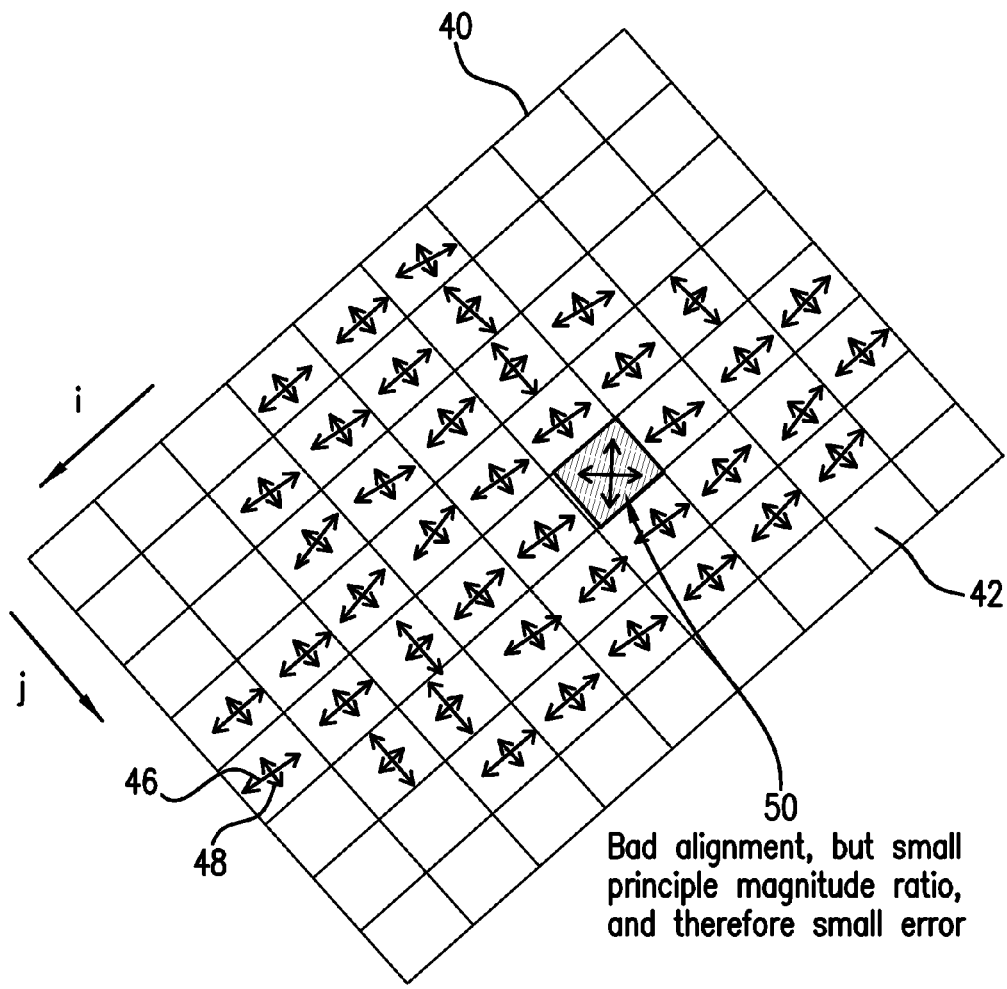
FIG. 6 depicts the selected grid having an orientation adjusted based on the principal flow directions of FIG. 4.

For example, as shown in FIGS. 5 and 6, the grid block 40 is rotated so that the grid block 40 runs at least substantially parallel to the principal directions 46 and 48. The resultant grid block 40 includes permeability parameters that can be expressed with permeability values with a reduced or minimal grid orientation related error.

In one embodiment, the grid block axes are oriented using one or more combined principal directions based on the principal direction in each grid cell. For example, a first combined permeability direction is calculated based on a plurality of first principal directions associated with the grid cells, such as the permeability directions 46 for each grid cell 42. A second combined permeability direction is calculated based on a plurality of second principal directions associated with the grid cells, such as the permeability directions 48 for each grid cell 42.

The combined principal directions can be calculated based on any suitable combination of principal directions calculated for each grid cell, such as a mean orientation of a principal direction in each grid cell.

In one embodiment, if the principal directions of all grid cells are not pointing in similar directions, individual grid cells are assigned a weight to determine how each grid cell impacts the grid block orientation. For example, each cell is given a weight associated with the ratio between the maximum and minimum permeability in the cell. The cells with higher ratios are given a higher weight in determining the optimal or suitable grid orientation, because the error introduced at low ratio cells is smaller than for cells with high ratios.

For example, as shown in FIG. 6, for each grid cell 42, the ratio between the magnitude of the equivalent permeability in the first principal flow direction 46 and the magnitude of the equivalent permeability in the second principal flow direction 48 is calculated. As is evident in FIG. 6, the highlighted grid cell 50 includes principal directions that are not well aligned to other cells. However, the ratio between principal direction magnitudes in the cell 50 is relatively small, and thus the orientation of the principal directions in the cell 50 is given relatively little weight as it will introduce only a limited error.

In one embodiment, stages 31-33 are repeated by applying the flow parameters to the rotated or re-oriented grid and estimating the principal directions. The calculation of the equivalent permeability tensors is performed again to check if the upscaled principal permeability directions are better aligned to the re-oriented grid. Further repetitions can be performed as needed to further refine or update the grid orientation.

In the fourth stage 34, further "upscaling" of fracture data, integration of equivalent fracture data and/or application of additional data is performed to complete the construction of the fluid flow model.

The apparatuses and methods described herein provide various advantages over prior art techniques. An automated method is provided for quickly calculating equivalent permeability values without introducing significant grid-related errors. In addition, the apparatuses and methods can be used in conjunction with commercially available reservoir simulators to solve the fractured reservoir fluid flow in a formation.

In conventional reservoir simulation, simulators typically use limited horizontal and vertical permeabilities to describe the permeability field. One reason to use this limited permeability description is that the finite difference solver in most simulators only can use permeability values which are parallel to the grid axes. However this description method also means that if there is a strong principal flow direction (e.g., in a fractured reservoir) and the grid is not aligned with this direction, then this approximation can lead to poor modeling results. The apparatuses and methods described herein address these deficiencies.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of orienting a flow model of a formation, the method comprising:
    selecting a plurality of cells representing a region of the formation, the plurality of cells having an orientation;
    estimating, by a processor, a first principal flow direction and a second principal flow direction for each of the plurality of cells, the first principal flow direction associated with a first magnitude and the second principal flow direction associated with a second magnitude;
    estimating a combined principal flow direction of each of the plurality of cells based on the first principal flow direction and the second principal flow direction, wherein estimating the combined principal flow direction includes calculating a ratio between the first magnitude and the second magnitude for at least one cell of the plurality of cells, and assigning a weight to the at least one cell based on the ratio; and
    adjusting, by a processor, the orientation of the plurality of cells based on the combined principal flow direction.

2. The method of claim 1, wherein the flow model is a dual continuum model and/or a dual porosity, dual permeability (DPDP) model.

3. The method of claim 1, wherein estimating the first principal flow direction and the second principal flow direction includes calculating equivalent information from a fracture model to each of the plurality of cells.

4. The method of claim 3, wherein the fracture model is a discrete fracture model (DFN).

5. The method of claim 3, wherein estimating the first principal flow direction and the second principal flow direction includes calculating an equivalent permeability tensor for each of the plurality of cells.

6. The method of claim 5, wherein the equivalent permeability tensor includes a first principal direction associated with a first permeability magnitude and a second principal direction associated with a second permeability magnitude.

7. The method of claim 6, wherein the orientation is defined by a first axis and a second axis, and adjusting the orientation includes orienting the plurality of cells so that at least one of: the first axis aligns with the first principal direction, and the second axis aligns with the second principal direction.

8. The method of claim 6, wherein the first magnitude is a first permeability magnitude calculated from an equivalent permeability tensor associated with the at least one cell, and the second magnitude is a second permeability magnitude calculated from the equivalent permeability tensor.

9. The method of claim 7, wherein adjusting the orientation includes rotating the plurality of cells so that the combined first principal direction is parallel to the first axis and the combined second principal direction is parallel to the second axis.

10. The method of claim 1, wherein estimating the combined principal flow direction includes:
   calculating an equivalent permeability tensor for each of the plurality of cells, the equivalent permeability tensor including a first principal direction associated with a first permeability magnitude and a second principal direction associated with a second permeability magnitude, the first magnitude corresponding to the first permeability magnitude and the second magnitude corresponding to the second permeability magnitude.

11. The method of claim 1, further comprising generating the flow model of the formation by applying flow parameters to the oriented plurality of cells.

12. An apparatus for orienting a flow model of a formation, the apparatus comprising:
   a data acquisition tool configured to collect data about one or more parameters of the formation; and
   a processor configured to construct the flow model, the processor configured to perform:
   selecting a plurality of cells representing a region of the formation, the plurality of cells having an orientation;
   estimating a first principal flow direction and a second principal flow direction for each of the plurality of cells, the first principal flow direction associated with a first magnitude and the second principal flow direction associated with a second magnitude;
   estimating a combined principal flow direction of each of the plurality of cells based on the first principal flow direction and the second principal flow direction, wherein estimating the combined principal flow direction includes calculating a ratio between the first magnitude and the second magnitude for at least one cell of the plurality of cells, and assigning a weight to the at least one cell based on the ratio; and
   adjusting the orientation of the plurality of cells based on the combined principal flow direction.

13. The apparatus of claim 12, wherein the flow model is a dual continuum model and/or a dual porosity, dual permeability (DPDP) model.

14. The apparatus of claim 12, wherein estimating the first principal flow direction and the second principal flow direction includes calculating equivalent information from a fracture model to each of the plurality of cells.

15. The apparatus of claim 14, wherein estimating the first principal flow direction and the second principal flow direction includes calculating an equivalent permeability tensor for each of the plurality of cells.

16. The apparatus of claim 15, wherein the equivalent permeability tensor includes a first principal direction associated with a first permeability magnitude and a second principal direction associated with a second permeability magnitude.

17. The apparatus of claim 16, wherein the orientation is defined by a first axis and a second axis, and adjusting the orientation includes orienting the plurality of cells so that at least one of: the first axis aligns with the first principal direction, and the second axis aligns with the second principal direction.

18. The apparatus of claim 16, wherein the first magnitude is a first permeability magnitude calculated from an equivalent permeability tensor associated with the at least one cell, and the second magnitude is a second permeability magnitude calculated from the equivalent permeability tensor.

19. The apparatus of claim 18, wherein adjusting the orientation includes rotating the plurality of cells so that the combined first principal direction is parallel to the first axis and the combined second principal direction is parallel to the second axis.

20. The apparatus of claim 12, wherein estimating the combined principal flow direction includes:
   calculating an equivalent permeability tensor for each of the plurality of cells, the equivalent permeability tensor including a first principal direction associated with a first permeability magnitude and a second principal direction associated with a second permeability magnitude, the first magnitude corresponding to the first permeability magnitude and the second magnitude corresponding to the second permeability magnitude.

* * * * *